United States Patent
Jackson et al.

(10) Patent No.: US 10,611,268 B2
(45) Date of Patent: Apr. 7, 2020

(54) MOTOR VEHICLE HAVING A MULTI-FUNCTION MOUNTING APPARATUS

(71) Applicant: Ford Global Technologies, LLC, Dearborn, MI (US)

(72) Inventors: Daniel Jackson, Basildon (GB); Ken Dell, Rainham (GB)

(73) Assignee: Ford Global Technologies, LLC, Dearborn, MI (US)

( * ) Notice: Subject to any disclaimer, the term of this patent is extended or adjusted under 35 U.S.C. 154(b) by 156 days.

(21) Appl. No.: 16/004,728

(22) Filed: Jun. 11, 2018

(65) Prior Publication Data
US 2019/0001846 A1 Jan. 3, 2019

(30) Foreign Application Priority Data
Jul. 3, 2017 (GB) .................................. 1710648.5

(51) Int. Cl.
| *B60N 2/015* | (2006.01) |
| *B60R 5/00* | (2006.01) |
| *B60R 7/04* | (2006.01) |
| *B60N 3/00* | (2006.01) |
| *B60N 2/30* | (2006.01) |
| *B60N 2/02* | (2006.01) |
| *B60N 2/32* | (2006.01) |
| *B60N 2/24* | (2006.01) |

(52) U.S. Cl.
CPC ..... *B60N 2/01508* (2013.01); *B60N 2/01525* (2013.01); *B60N 2/02* (2013.01); *B60N 2/0292* (2013.01); *B60N 2/30* (2013.01); *B60N 2/32* (2013.01); *B60N 3/001* (2013.01); *B60R 5/006* (2013.01); *B60R 7/04* (2013.01); *B60N 2/242* (2013.01)

(58) Field of Classification Search
CPC .... B60N 2/005; B60N 2/015; B60N 2/01508; B60N 2/01516; B60N 2/01525; B60N 2/02; B60N 2/0292; B60N 2/32; B60R 5/006; B60R 7/04
USPC ..................... 296/64, 65.03, 65.13
See application file for complete search history.

(56) References Cited

U.S. PATENT DOCUMENTS

| 5,443,239 | A | 8/1995 | Laporte | |
| 6,145,913 | A * | 11/2000 | Odagaki | B60N 2/01 296/65.03 |
| 6,991,285 | B1 | 1/2006 | Hemenway | |
| 2007/0132265 | A1 * | 6/2007 | Tsukamoto | B60N 2/0155 296/65.03 |

(Continued)

FOREIGN PATENT DOCUMENTS

| DE | 4132279 A1 | 4/1993 |
| DE | 10319404 A1 | 11/2004 |

(Continued)

OTHER PUBLICATIONS

English translation of FR 2781731; retreived on Jan. 8, 2019 via PatentTranslate located at www.epo.org. (Year: 2019).*

*Primary Examiner* — Jason S Daniels
(74) *Attorney, Agent, or Firm* — David Coppiellie; Price Heneveld LLP

(57) ABSTRACT

A motor vehicle multi-function mounting apparatus is disclosed comprising a support pedestal and a two part quick release mounting assembly for selectively attaching one of a selection of differing objects to an upper end of the support pedestal.

14 Claims, 12 Drawing Sheets

(56) References Cited

U.S. PATENT DOCUMENTS

| | | | |
|---|---|---|---|
| 2016/0152281 A1* | 6/2016 | Hansen | B60N 2/01516 296/193.07 |
| 2016/0347205 A1* | 12/2016 | Cardone | B60N 2/015 |
| 2017/0129441 A1 | 5/2017 | Murthy | |

FOREIGN PATENT DOCUMENTS

| | | | | |
|---|---|---|---|---|
| DE | 102012009556 A1 | | 11/2013 | |
| FR | 2781731 A1 | | 2/2000 | |
| FR | 2864481 A1 | * | 7/2005 | B60N 2/01591 |
| GB | 2542556 A | * | 3/2017 | A61G 5/121 |
| WO | 9743141 A1 | | 11/1997 | |

* cited by examiner

MOTOR VEHICLE HAVING A MULTI-FUNCTION MOUNTING APPARATUS

FIELD OF THE INVENTION

The present invention generally relates to motor vehicles, and more particularly relates to a motor vehicle mounting apparatus having improved utility.

BACKGROUND OF THE INVENTION

It is generally well-known to provide a motor vehicle with two or more rows of seats for use by occupants of the motor vehicle. Particularly in the case of small commercial vehicles having passenger seating such as minibuses and for multi-purpose vehicles (MPVs) there is an increasing need to offer a high level of seating flexibility such as fore-aft movement of the seating and removal of one or more rows of seating.

However, such seats are often heavy (e.g., weighing 30 kg) due to the need to provide in many cases integral three point safety restraint anchorage points and the consequential need for substantial floor mounting structures sometimes referred to as a "seat leg" or a "support pedestal." The removal of such seats along with their associated support pedestal for the purpose of loading long items typically is difficult to achieve within the confines of a motor vehicle. As a consequence, there is a need to provide a seat that is easier to handle.

In addition to the foregoing, there is an increased need to provide a support within the passenger compartment for other objects for use by occupants of the motor vehicle such as for example, a table, an entertainment center, a storage bin, a storage locker and a rack for sports equipment that can provide in-vehicle secure storage, particularly for long items such as cycles, surfboards and canoes.

It would be desirable to provide a motor vehicle multi-function mounting apparatus that not only allows for the easier removal or repositioning of a seat of the motor vehicle but also has increased versatility by being able to securely mount a range of differing objects in the passenger compartment of the motor vehicle.

SUMMARY OF THE INVENTION

According to one aspect of the present disclosure, there is provided a motor vehicle having a body structure defining a passenger compartment having a floor and at least one motor vehicle multi-function mounting apparatus mounted on the floor for mounting an object in the passenger compartment, the motor vehicle multi-function mounting apparatus comprising a support pedestal having at a lower end thereof a quick release securing mechanism for securing in use the support pedestal to the floor, and a two part quick release mounting assembly for attaching one of a number of differing objects including a passenger seat for a passenger of the motor vehicle to an upper end of the support pedestal, a first part of a two part quick release mounting assembly is formed as part the support pedestal and a second part of the quick release mounting assembly is formed as part of the object attached to the pedestal wherein the floor includes a number of longitudinally extending elements and the quick release securing mechanism of each support pedestal is operable in a first mode of operation to react against at least one of the longitudinally extending elements to prevent sliding movement of the support pedestal relative to the floor and the quick release securing mechanism is operable in a second mode of operation to permit sliding movement of the support pedestal along the floor in a longitudinal direction of the motor vehicle.

This has the advantage that a number of differing objects can be supported using a single support pedestal by removing one object and replacing it with another object providing different functionality. This also has the advantage that the motor vehicle has improved versatility in that a number of differing objects can be supported in the passenger compartment using the same support pedestal.

One of the two parts of the two part quick release mounting assembly may include a latching mechanism including one or more moveable latch members, each of the latch members may be arranged for engagement with a respective static retention device on the other part of the two part quick release mounting assembly.

The support pedestal may be securable in use to the floor of the motor vehicle in first and second rotational positions and, in the first rotational position, a first end of the support pedestal may be nearer to a front end of the motor vehicle than a second end of the support pedestal and, in the second rotational position, the first end of the support pedestal may be nearer to a rear end of the motor vehicle than the second end of the support pedestal.

The second part of the two part quick release mounting assembly may be attachable to the support pedestal in two rotational positions, one in which a first end of the second part may be nearer to a first end of the support pedestal than a second end of the second part and second rotational position in which the first end of the second part may be nearer to the second end of the support pedestal than the second end of the second part. When the object mounted on the support pedestal by the second part of the two part quick release mounting assembly is a passenger seat for a passenger of the motor vehicle, the passenger seat may be mountable in forward facing and rearward facing positions.

The passenger seat may include a remote release mechanism for the quick release securing mechanism used to secure in use the support pedestal to the floor of the motor vehicle. The remote release mechanism may include an actuation member slidingly supported by the first part of the two part quick release mounting assembly and an actuating device moveably mounted on the second part of the two part quick release mounting assembly for abutment against one end of the actuation member so as to selectively release the quick release securing mechanism. The actuating device may be moved by a linkage in response to an input from a user of the vehicle applied via a remote human machine input device in the form of one of a handle, a pull knob, a push knob, a rotary knob and a lever.

Other objects mountable on the support pedestal by the second part of the two part quick release mounting assembly may be a captain's chair, a table, a sports equipment mount, a cycle rack, an entertainment unit, a storage unit, a child seat, a table, a refrigerator, a storage box and a storage locker.

There may be more than one support pedestal mounted on the floor of the motor vehicle. There may be two support pedestals mounted on the floor of the motor vehicle and the object may be mounted in the passenger compartment of the motor vehicle using both of the support pedestals. In which case, the object may be a bench seat for accommodating more than one passenger.

According to another aspect of the present invention, a vehicle. The vehicle includes a body structure defining a passenger compartment having a floor, and a mounting apparatus mounted on the floor for mounting an object in the passenger compartment apparatus. The mounting apparatus includes a support pedestal having at a lower end thereof a quick release securing mechanism for securing the support pedestal to the floor, and a two part quick release mounting assembly for attaching the object to an upper end of the support pedestal.

According to a further aspect of the present invention, a vehicle mounting apparatus is provided. The vehicle mounting apparatus includes a support pedestal having at a lower end thereof a quick release securing mechanism for securing the support pedestal to a floor of a vehicle, and a two part quick release mounting assembly for attaching an object to an upper end of the support pedestal and having a first part that forms part the support pedestal and a second part that forms part of the object.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4b is a rear view on a smaller scale of the passenger seat shown in FIG. 4a;

FIG. 15b is a diagrammatic representation of the latching mechanism forming part of the first part of the two part quick release mounting assembly shown in FIG. 15a.

DETAILED DESCRIPTION OF THE PREFERRED EMBODIMENTS

Figure 1:
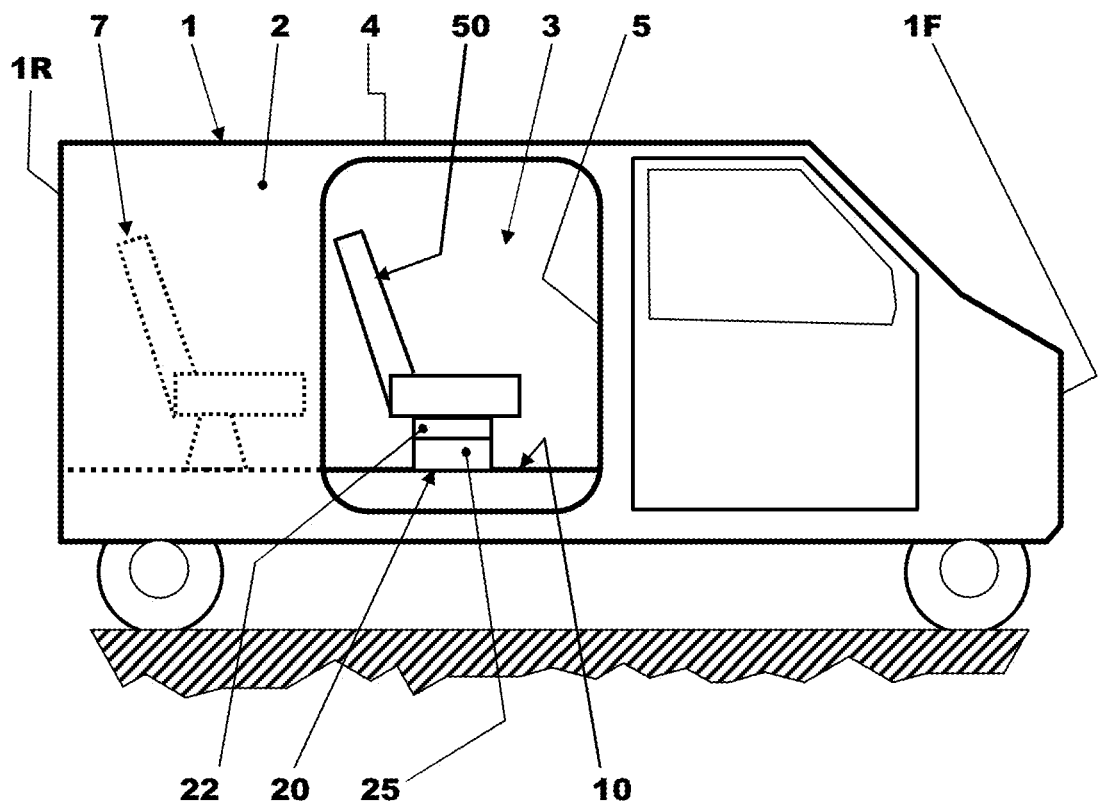
FIG. 1 is a side view of a motor vehicle according to one embodiment having three motor vehicle multi-function mounting apparatus supporting three seats forming a second row of seating.
Figure 2:
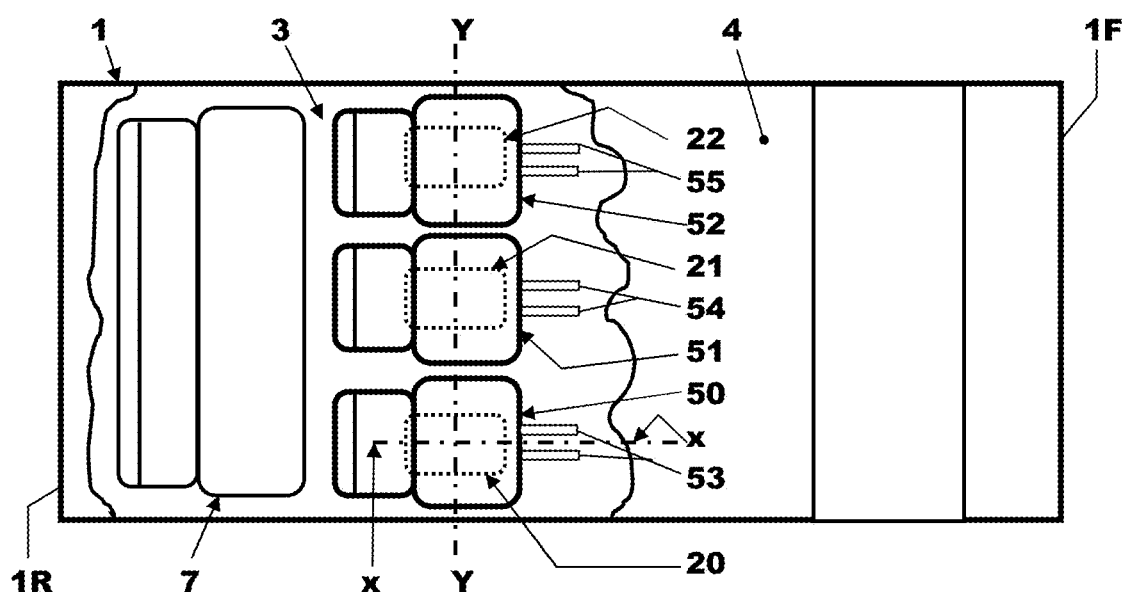
FIG. 2 is a plan view of the motor vehicle shown in FIG. 1 with a roof of the motor vehicle partially cut-away to show the second row seating.

With reference to FIGS. 1 and 2, a motor vehicle 1 having a front end IF and a rear end 1R is illustrated having a body structure 2 defining a passenger compartment 3 and a side door aperture 5 to provide access to a passenger compartment 3 of the motor vehicle 1. The motor vehicle 1 has a roof 4 and a floor 10 on which is mounted three second row seats 50, 51, 52 and a row of third row seats 7.

Each of the seats 50, 51, 52 is mounted on the floor 10 of the motor vehicle 1 by a respective motor vehicle multi-function mounting apparatus 20, 21, 22 of identical construction and will be described hereinafter with reference to the right hand side seat 50 and its respective motor vehicle multi-function mounting apparatus 20.

The motor vehicle multi-function mounting apparatus 20 comprises a support pedestal 25 having at a lower end thereof a quick release securing mechanism for securing in use the support pedestal 25 to the floor 10 of the motor vehicle 1 and a two part quick release mounting assembly for selectively attaching one of a selection of differing objects which in this case is the seat 50 to an upper end of the support pedestal 25. A first part of the two part quick release mounting assembly forms part the support pedestal 25 as will be described hereinafter and a second part 22 of the quick release mounting assembly forms part of the passenger seat 50.

The quick release securing mechanism is operable in a first mode of operation to prevent in use sliding movement of the support pedestal 21 relative to the floor 10 of the motor vehicle 1 and is operable in a second mode of operation to permit sliding movement of the support pedestal 25 relative to the floor 10 in a longitudinal direction of the motor vehicle 1. A longitudinal direction of the motor vehicle 1 is from the front end 1F of the motor vehicle 1 to the rear end 1R or vice-versa and so the axis of sliding x-x shown on FIG. 2 for the seat 50 is said to extend in a longitudinal direction of the motor vehicle 1. The transverse axis Y-Y shown on FIG. 2 is aligned with a central point of the support pedestal 25 when the support pedestal 25 is in a maximum rearward position.

The floor 10 includes a number of longitudinally extending elements arranged in one embodiment in pairs 53, 54, 55. In this exemplary embodiment, each of the longitudinally extending elements forming the pairs 53, 54, 55 is in the form of a T-slot formed in the floor 10. The quick release securing mechanism of the support pedestal 25 is operable in a first mode of operation to react against a respective pair 53 of the longitudinally extending elements to prevent sliding movement of the support pedestal 25 relative to the floor 10 of the motor vehicle 1.

Figure 3A:
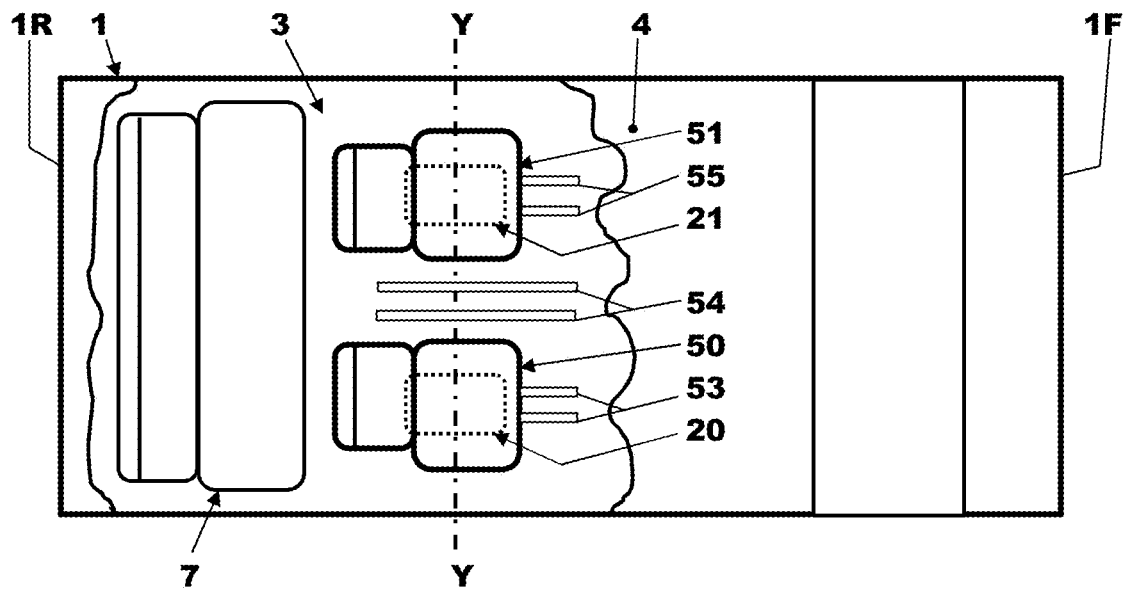
FIG. 3a is a plan view similar to FIG. 2 but showing a second row of seating having only two passenger seats rotationally positioned in a forward facing positions.
Figure 3B:
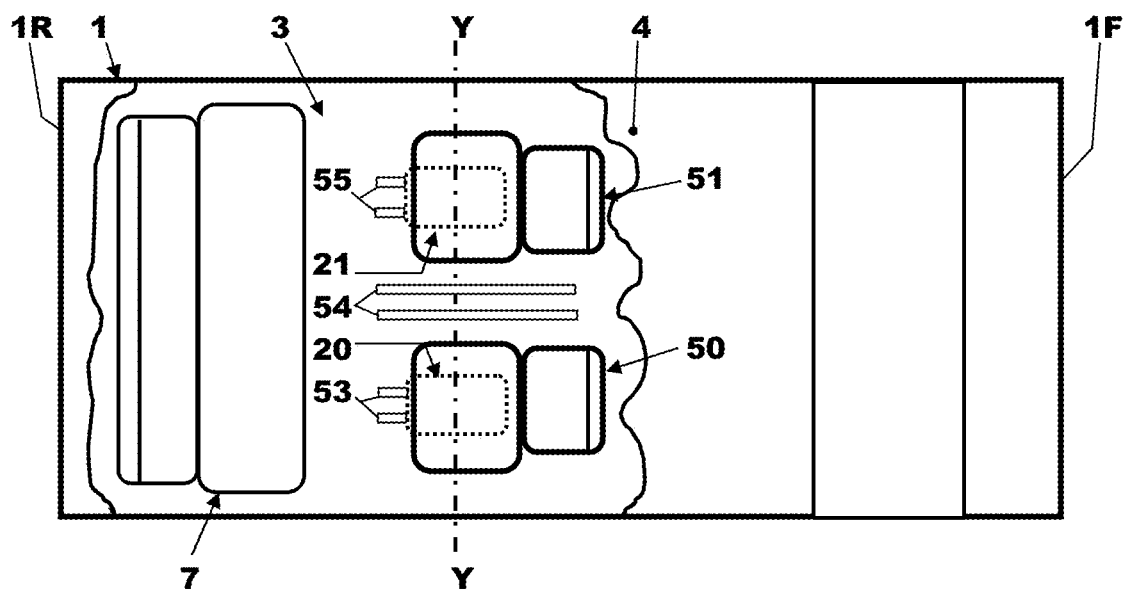
FIG. 3b is a plan view similar to FIG. 3a but showing the two passenger seats rotationally positioned in a rearward facing positions.

With particular reference to FIGS. 3a and 3b the motor vehicle 1 is in most respects identical to that previously described with respect to FIGS. 1 and 2 with the exception that there are only two passenger seats 50, 51 and not three as previously described. However, the functionality for both the embodiment of FIGS. 1 and 2 and that of FIGS. 3a and 3b is identical.

One of the features of the present disclosure is that each of the seats can be positioned so as to face the front end IF of the motor vehicle 1 or towards the rear end 1R of the motor vehicle 1. In FIG. 3a the two seats 50, 51 are shown in a rotational position referred to as 'forward facing' where they face the front end IF of the motor vehicle 1 and in FIG. 3b the two seats 50, 51 are shown in a rotational position referred to as 'rearward facing' where they face the rear end 1R of the motor vehicle 1.

Figure 4A:
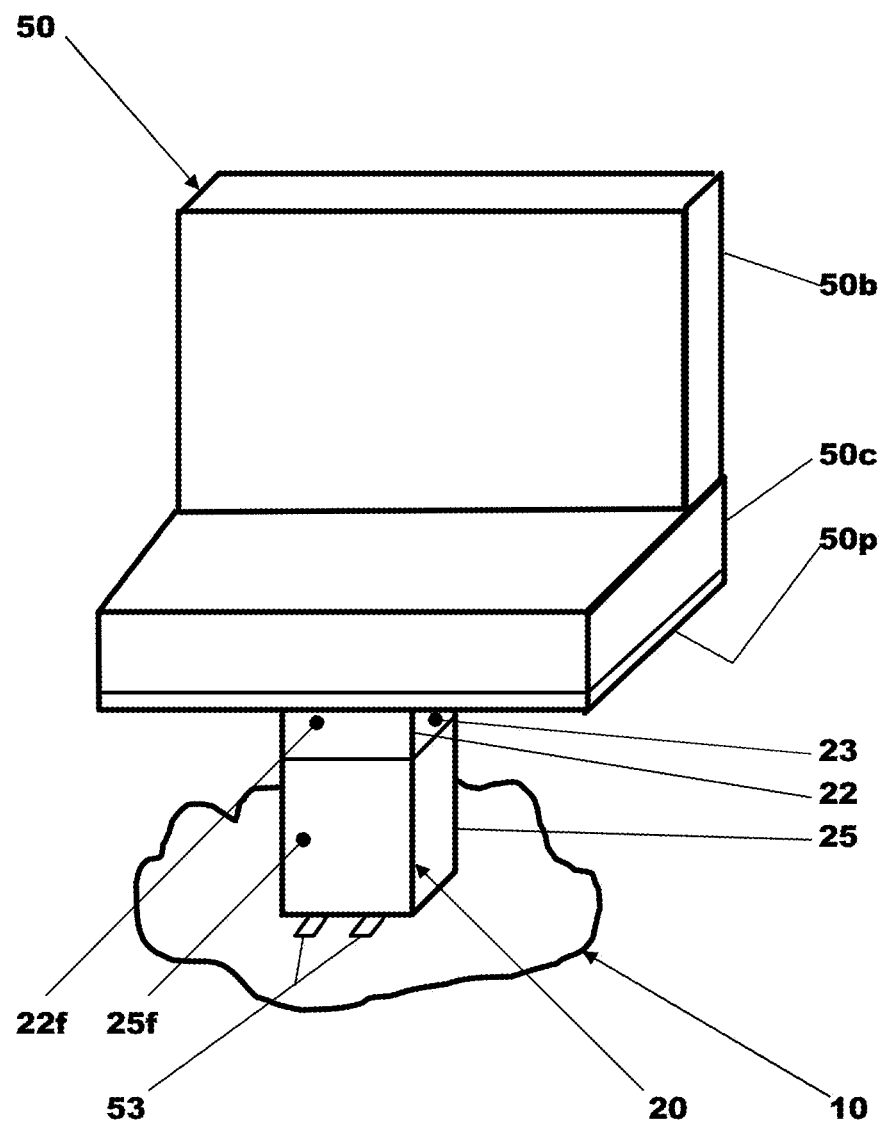
FIG. 4a is a pictorial diagrammatic representation of a right hand side one of the passenger seats shown in FIGS. 1-3a on a larger scale showing the passenger seat in a forward facing rotational position.
Figure 4B:
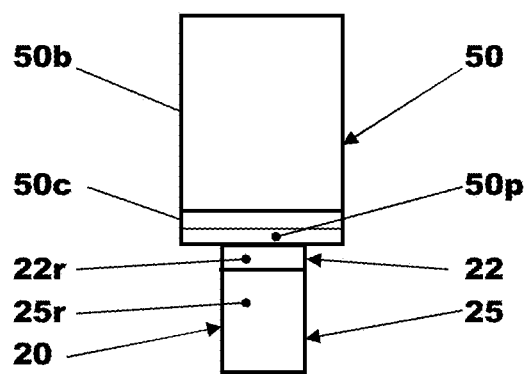

In one embodiment this dual rotational positioning is provided by rotation of the respective support pedestal that is to say, with respect to the pedestal 25, the support pedestal 25 is securable to the floor 10 of the motor vehicle 1 in first and second rotational positions that differ from one another by 180 degrees. In the first rotational position shown in FIG. 3a, a first end formed by a front wall 25f (See FIG. 4a) of the support pedestal 25 is nearer to the front end IF of the motor vehicle 1 than a second end formed by a rear wall 25r (See FIG. 4b) of the support pedestal 25 and in the second rotational position shown in FIG. 3b the first end formed by the front wall 25f of the support pedestal 25 is nearer to the rear end 1R of the motor vehicle 1 than the second end formed by the rear wall 25r of the support pedestal 25. This requires the support pedestal 25 to be rotated about a vertical axis by 180 degrees.

As an alternative to this arrangement the support pedestal 25 always remains rotationally positioned such that the first or front end formed by the front wall 25f (See FIGS. 4a and 4b) of the support pedestal 25 is nearer to the front end IF of the motor vehicle 1 than the second or opposite end formed by the rear wall 25r (See FIGS. 4a and 4b) of the support pedestal 25 but the second part 22 of the quick release mounting assembly is symmetrically formed so as to permit it to be rotated by 180 degrees. That is to say, the second part 22 of the two part quick release mounting assembly is attachable to the support pedestal 25 in two rotational positions, one in which a first end formed by a front wall 22f (See FIG. 4a) of the second part 22 is nearer to the first end formed by the front wall 25f of the support pedestal 25 than a second or opposite end formed by the rear wall 22r (See FIG. 4b) of the second part 22 and a second rotational position in which the first end formed by the front wall 22f of the second part 22 is nearer to the second end formed by the rear wall 25r of the support pedestal 25 than the second end formed by the rear wall 22r of the second part 22. This requires a rotation of the second part 22 by 180 about a vertical axis.

With particular reference to FIGS. 4a-7b the motor vehicle multi-function mounting apparatus 20 will be described in more detail. As previously referred to the quick release securing mechanism is operable in a first mode of operation to prevent in use sliding movement of the support pedestal 25 relative to the floor 10 of the motor vehicle 1 and in a second mode of operation to permit sliding movement of the support pedestal 25 relative to the floor 10 in a longitudinal direction of the motor vehicle.

Figure 5:
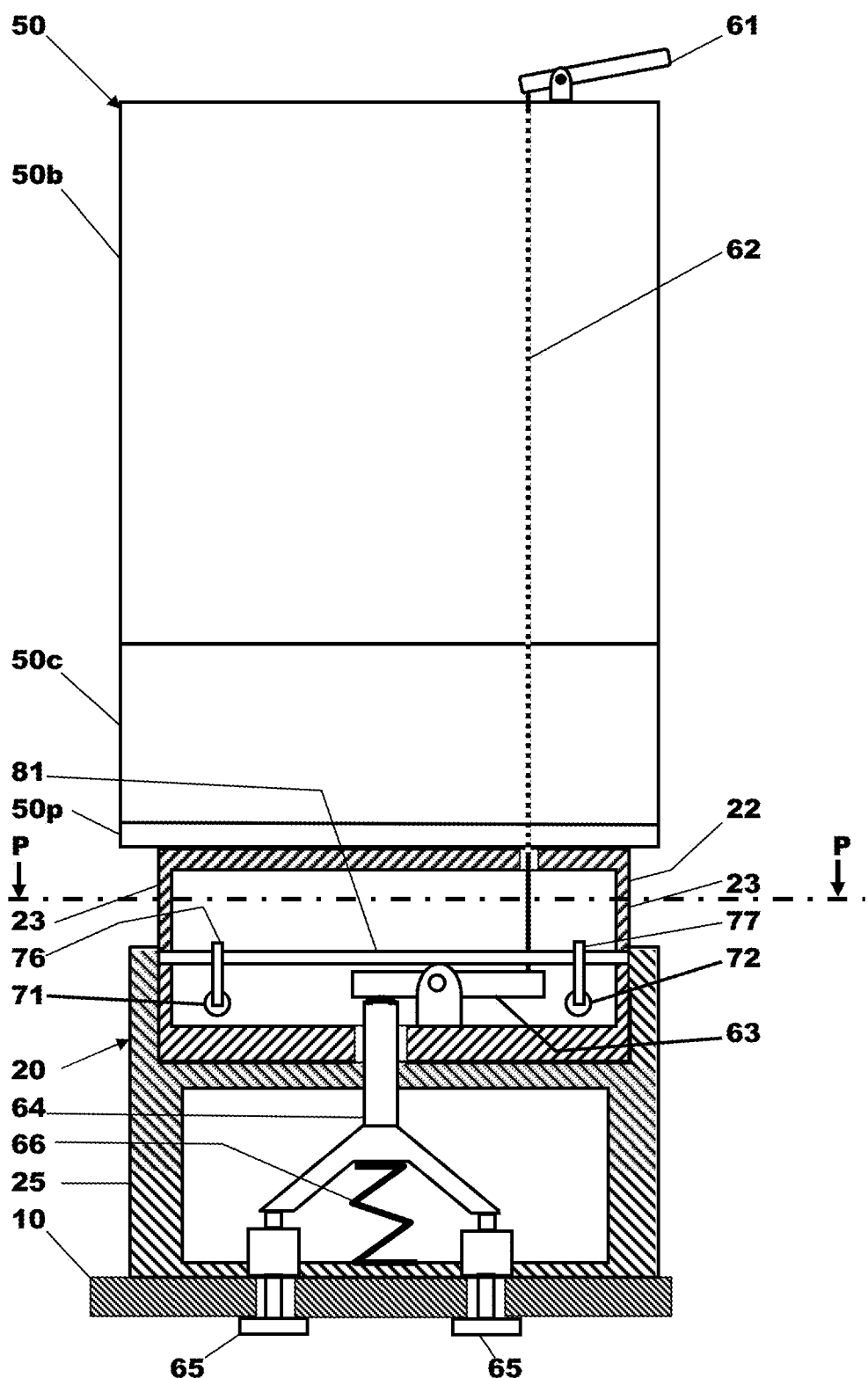
FIG. 5 is a front diagrammatic part sectioned view of the passenger seat shown in FIGS. 4a and 4b showing a remote release mechanism for a quick release securing mechanism used to secure a support pedestal to a floor of the motor vehicle.

With particular reference to FIG. 5 the passenger seat 50 comprise a seat back 50b and a seat cushion 50c supported on a structural seat pan 50p to which is fastened the second part 22 of the two part quick release mounting assembly so that it forms part of the seat 50. The seat 50 includes part of a remote release mechanism for the quick release securing mechanism used to secure in use the support pedestal 25 to the floor 10 of the motor vehicle 1.

The remote release mechanism includes, in the case of this example, an actuation member 64 slidingly supported by the first part of the two part quick release mounting assembly in the form of the support pedestal 25 and an actuating device 63 moveably mounted on the second part 22 of the two part quick release mounting assembly for abutment against one end of the actuation member 64 so as to selectively release the quick release securing mechanism.

The actuating device is in this embodiment in the form of a lever 63 moved by a linkage in the form of a cable 62 in response to an input from a user of the vehicle applied via a remote human machine input device in the form of a handle 61. It will be appreciated that other forms of human machine input device such as a pull or push knob or a rotary knob or lever could be used to replace the handle 61.

The quick release securing mechanism comprises of the actuation member 64 which has an upwardly extending pin for engagement with the lever 63 and a forked base abutting against a pair of locking members 65. Each of the locking members 65 is T-shaped and is engaged with one of the longitudinally extending elements formed in the floor 10.

In one embodiment, a spring 66 is used to bias the pair of locking members 65 into engagement with the floor 10 when in the first mode of operation thereby preventing sliding movement of the support pedestal 25 relative to the floor 10 of the motor vehicle 1.

In the second mode of operation used to permit sliding movement of the support pedestal 25 relative to the floor 10, a force is applied to the handle 61 in a downwards direction the force is transferred via the cable 62 to the lever 63. The lever 63 presses down against the end of the upwardly extending pin of the actuation member 64 thereby moving the actuation member 64 downwardly against the action of the spring 66. This causes the locking members 65 to be moved out of engagement with the floor 10 thereby allowing the pedestal 25 to be slid relative to the floor 10.

Although not shown, the quick release securing mechanism may be provided with a device to permit the support pedestal 25 to be easily removed from the passenger compartment 3. One of the advantages of such a remote release mechanism for the quick release securing mechanism is that the quick release securing mechanism can be easily released by a person wishing to enter or leave the third row of seating 7 by moving the handle 61. It will be appreciated that in order to more easily gain access to the third row of seating 7 it is preferable if the second row seat 50, 51, 52 on the side where entry or egress is to be made is slid forward from a normal use to position to a forward position as this will provide more room between the respective passenger seat 50, 51, 52 and a rear upright of the side door aperture 5.

A further advantage of the remote release mechanism for the quick release securing mechanism is that there is no physical connection between the parts of the mechanism located in the passenger seat 50 and the second part 22 of the two part quick release mounting assembly and the parts of the mechanism located in the support pedestal 25. This allows the passenger seat 50 to be lifted off the support pedestal 25 without the need for disconnecting any parts of the linkage between the handle 61 and the actuation member

64. Furthermore placing the passenger seat 50 with the associated second part 22 of the two part quick release mounting assembly onto the support pedestal 25 automatically connects the handle 61 to the actuation member 64 without the need to make any connections.

Figure 6:
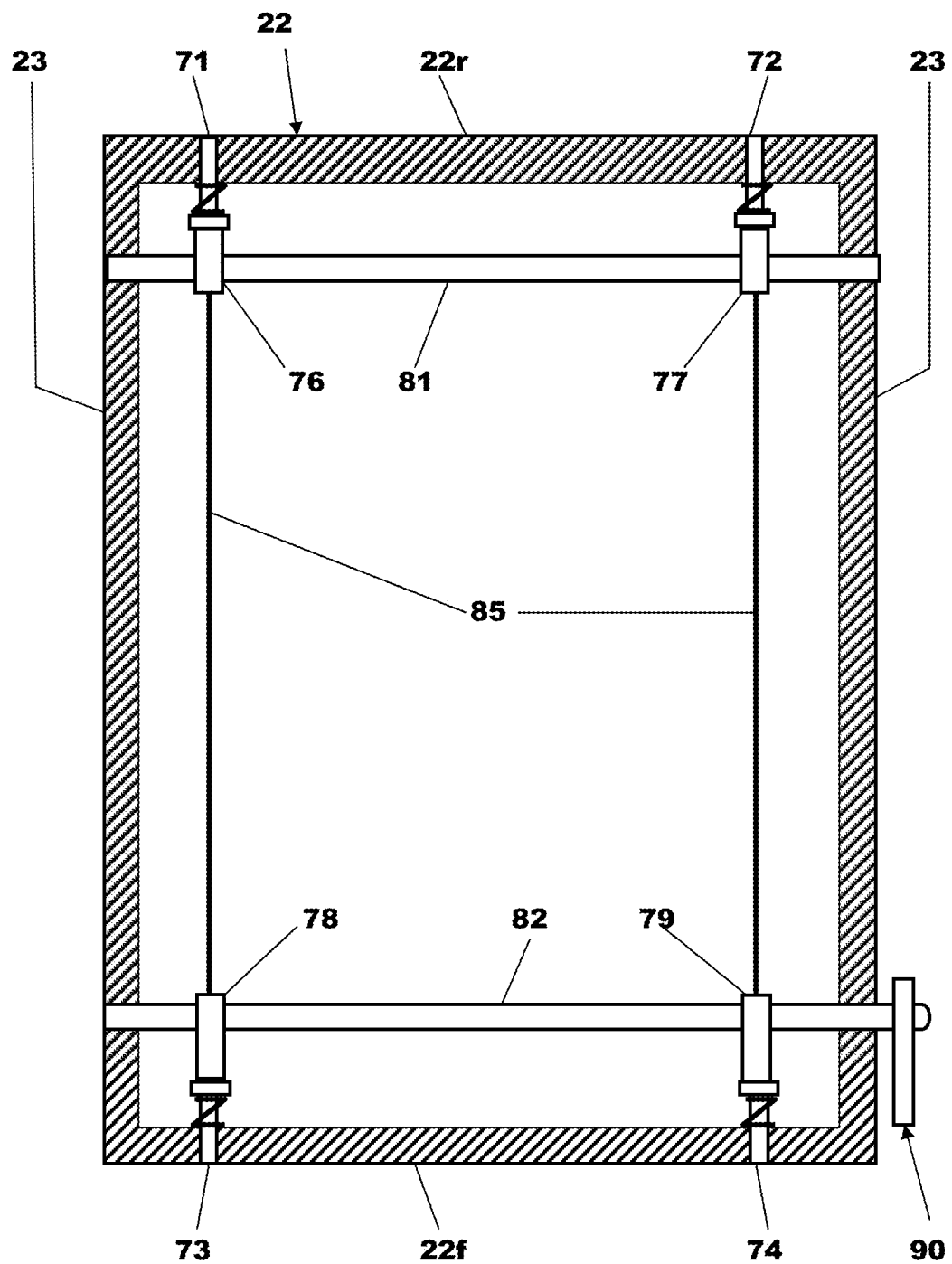
FIG. 6 is a diagrammatic cross-sectional view on the line P-P on FIG. 5 of a latching mechanism forming part of the second part of the quick release mounting assembly.
Figure 7A:
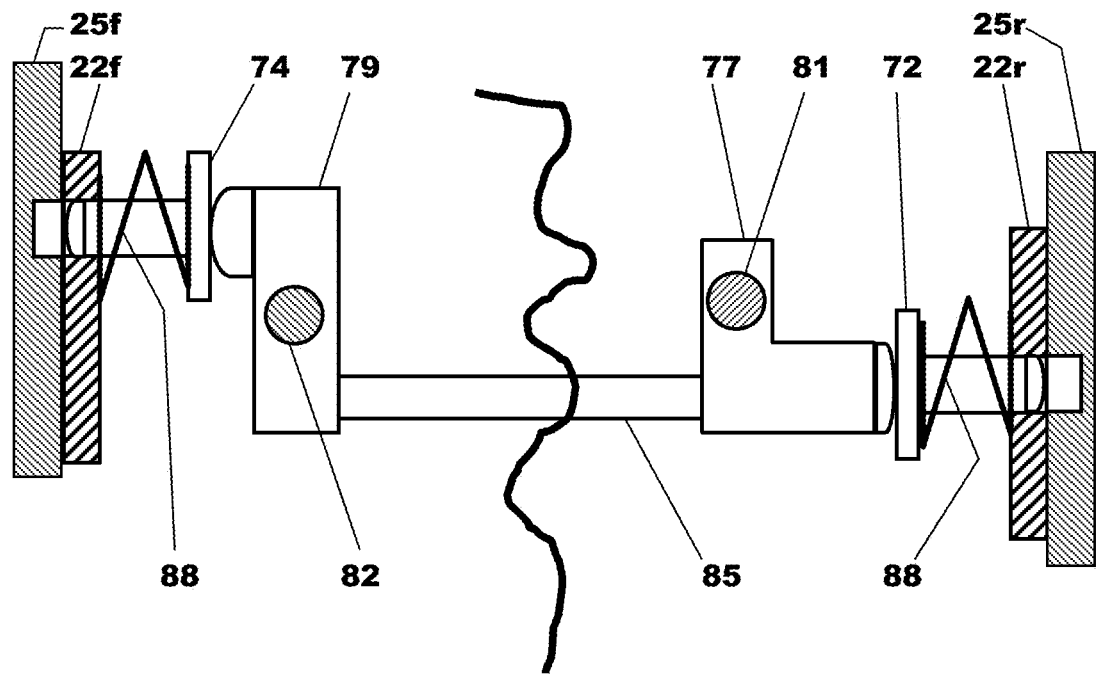
FIG. 7a is a diagrammatic side view on an enlarged scale of part of the latching mechanism shown in FIG. 6 showing the mechanism in an un-latched state.
Figure 7B:
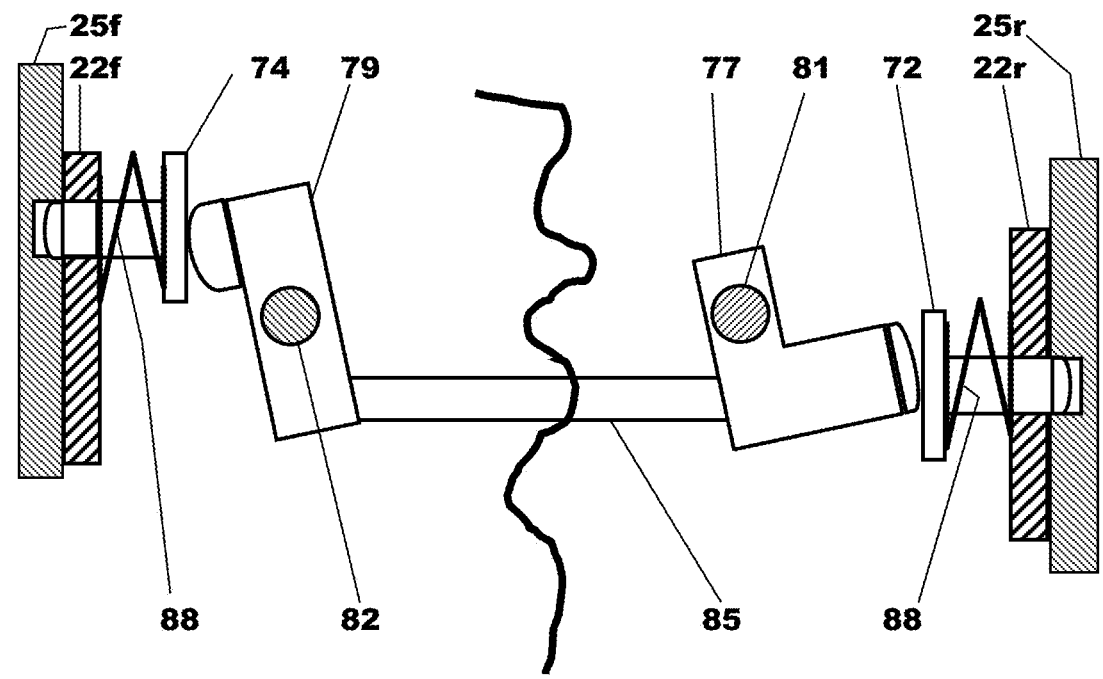
FIG. 7b is a diagrammatic side view on an enlarged scale of part of the latching mechanism shown in FIG. 6 showing the mechanism in a latched state.

With particular reference to FIGS. 6-7b one embodiment of the second part 22 of the two part quick release mounting assembly is shown in a diagrammatic form. The second part 22 of the two part quick release mounting assembly includes a latching mechanism including in this case four moveable latch members 71, 72, 73, 74 arranged for engagement with respective static retention devices in the form of recesses formed as part of the front and rear walls 25f and 25r forming the first and second ends of the of the support pedestal 25 forming the first part of the two part quick release mounting assembly.

The latch members 71, 72, 73, 74 are moveable into latching positions shown in FIG. 7b by means of respective actuation arms 71, 72, 76, 77 mounted on drive shafts 81, 82 respectively. The actuation arms 78, 79 are connected to the actuation arms 76, 77 respectively by link rods 85 so that rotation of the drive shaft 82 will cause the drive shaft 81 to be rotated a like amount.

The drive shafts 81, 82 are rotatably mounted in side walls 23 of a housing forming part of the second part 22 of the two part quick release mounting assembly and a handle 90 is attached to one end of the drive shaft 82.

Each of the latch members 71, 72, 73, 74 is biased by a respective spring 88 towards the respective actuation arm 76, 77, 78, 79 with which it co-operates.

The handle 90 may be securable by a spring loaded detent device (not shown) in two rotational position. In the first rotational position of the handle 90, the rotational position of the actuation arms 76, 77, 78, 79 is such that the latch members 71, 72, 73, 74 are positioned by the actuation arms 76, 77, 78, 79 and the springs 88 in retracted, non-latching, positions shown in FIGS. 6 and 7a.

In the second rotational position of the handle 90 the rotational position of the actuation arms 76, 77, 78, 79 is such that the latch members 71, 72, 73, 74 are displaced from the retracted position to extended, latching positions shown in FIG. 7b against the action of the associated springs 88 so as to engage with the recesses formed in the front and rear walls 25f and 25r forming the first and second ends of the support pedestal 25.

One advantage of the design of the second part 22 of the two part quick release mounting assembly shown in FIGS. 6-7b is that it is symmetrical and therefore reversible on the support pedestal 25. That is to say, as previously mentioned, the second part 22 of the two part quick release mounting assembly is attachable to the support pedestal 25 in two rotational positions. In one rotational position the first end formed by the front wall 22f of the second part 22 is nearer to the first end formed by the front wall 25f of the support pedestal 25 than a second end formed by the rear wall 22r of the second part 22 and in a second rotational position the first end formed by the front wall 22f of the second part 22 is nearer to the second end formed by the rear wall 25r of the support pedestal 25 than the second end formed by the rear wall 22r of the second part 22. This allows the passenger seat 50 to be mounted in a forward facing rotational position as shown in FIGS. 2 and 3a and in a rearward facing position as shown in FIG. 3b.

It will be appreciated that the quick release securing mechanism shown in FIG. 5 and the quick release mounting assembly shown in FIGS. 6 to 7b are provided by way of example and that the present disclosure is not limited to the use of such arrangements.

Figure 8:
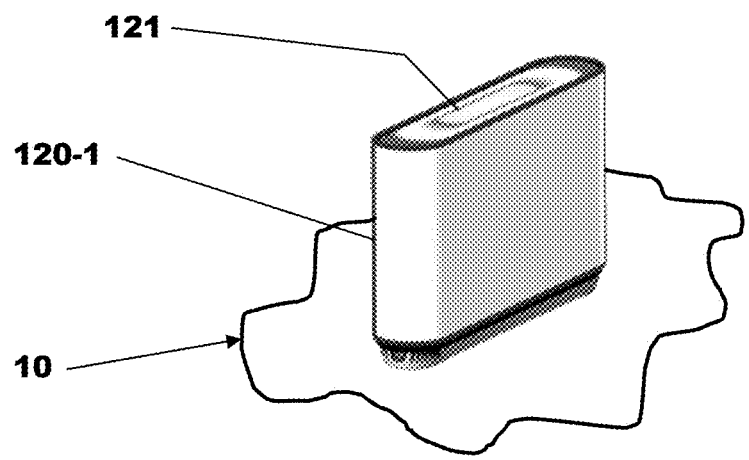
FIG. 8 is a pictorial view of a second embodiment of a support pedestal with no object mounted thereon.

With reference to FIG. 8 there is shown a second embodiment of support pedestal 120-1 that is intended to be a direct replacement for the support pedestal 25 previously described. As with the previous embodiment the support pedestal 120-1 is of a very strong construction because it has to transfer all of the loads from a passenger seat when such a passenger seat is mounted thereupon.

It will be appreciated that it is common practice for such second row passenger seats to use seat integrated restraints (safety belts) so that the support pedestal 120-1 must be engineered with sufficient strength to transfer such safety belt loads to the floor structure irrespective of whether the passenger seat is facing forwards or rearwards. This may require the use of ultra-high strength steel or a composite structure using such steel for strength and a non-ferrous material such as magnesium alloy or aluminum alloy to reduce the weight of the support pedestal. The support pedestal may for example comprises a rigid skeletal structure made from ultra-high strength steel, magnesium alloy or aluminum alloy covered with an aesthetic cover made from plastic or another lightweight material.

Although not specifically shown in FIG. 8 the support pedestal 120-1 is slidingly mounted upon a single longitudinally extending floor element such as a T-groove in the floor 10 or a rail mounted upon the floor 10 so as to allow the support pedestal 120-1 to be slid forwards and backwards in the motor vehicle.

A first part 121 of a two part quick release mounting assembly is shown in FIG. 8 formed as part of the support pedestal 120-1. It will be appreciated that the first part 121 can be an actual part of the support pedestal 120-1, that is to say, an integral part of the support pedestal 120-1 or can be a separate component that is fastened to the support pedestal 120-1.

Figure 9:
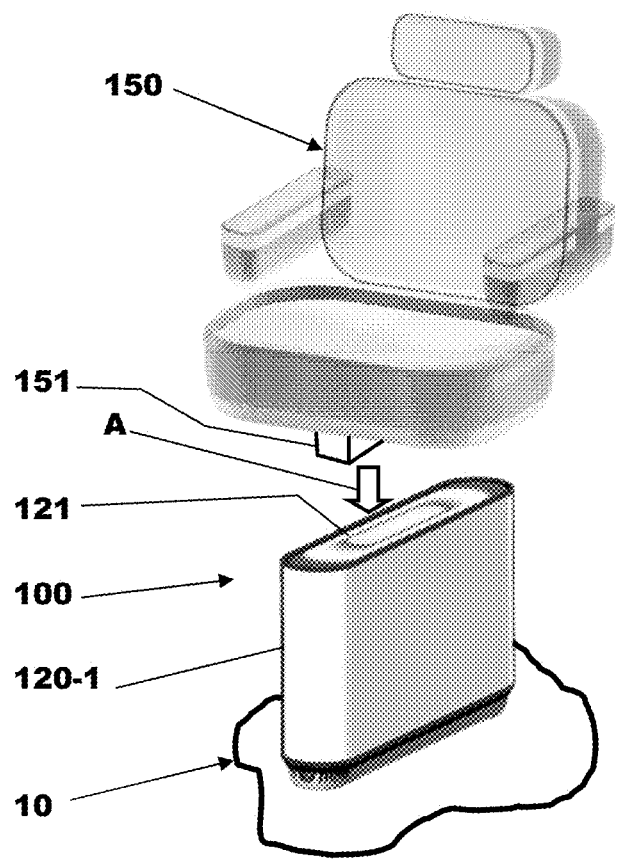
FIG. 9 is a pictorial view showing a passenger seat in the process of being mounted onto the support pedestal shown in FIG. 8.

With reference to FIG. 9 an object in the form of a passenger seat 150 is shown being lowered in the direction of arrow "A" onto the support pedestal 120-1. The passenger seat 150 forms one of a number of different objects that can be supported by the support pedestal 120-1. A two part quick release mounting assembly includes a second part 151 fastened to a lower side of the passenger seat 150 that is constructed so as to automatically latch into the first part 121 when the passenger seat is placed upon the support pedestal 120-1. The support pedestal 120-1 and the first and second parts 121 and 151 form in combination a motor vehicle multi-function mounting apparatus 100. A release mechanism (not shown) may be provided to permit the passenger seat 150 to be removed from the support pedestal 120-1.

As before, the passenger seat 150 can be mounted in a forward facing rotational position as shown in FIG. 9 or in a rearward facing rotational position that is rotated 180 degrees about a vertical axis from the position shown in FIG. 9. This can be achieved as previously referred to by either providing for the support pedestal 120-1 to be constructed so that it can be reversed on the longitudinally extending floor element or for the first and second parts 121 and 151 of the two part quick release mounting assembly to be constructed so that the passenger seat 150 can be mounted in forward or rearward facing rotational positions.

Figure 10:
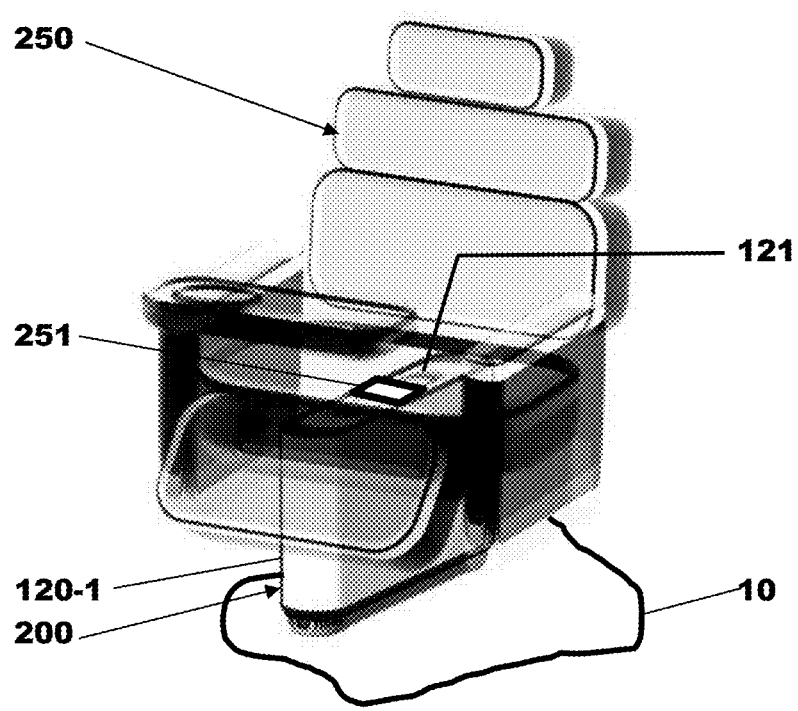
FIG. 10 is a pictorial view showing a captain's chair mounted on the support pedestal shown in FIG. 8.

With particular reference to FIG. 10 a further object in the form of a captain's chair 250 is shown in position on the support pedestal 120-1. As before, a two part quick release mounting assembly includes a second part 251 connected to a lower side of the captain's chair 250 that is constructed so as to automatically latch into the first part 121 when the chair 250 is placed upon the support pedestal 120-1. A release mechanism (not shown) is provided to permit the captain's chair 250 to be removed from the support pedestal 120-1. The support pedestal 120-1 and the first and second parts 121 and 251 form in combination a motor vehicle multi-function mounting apparatus 200.

As will be appreciated by those skilled in the art a captain's chair includes a rotary mounting (not shown) that enables the chair 250 to be rotated into any desired rotational position about a vertical axis including forward and rearward facing positions.

Figure 11:
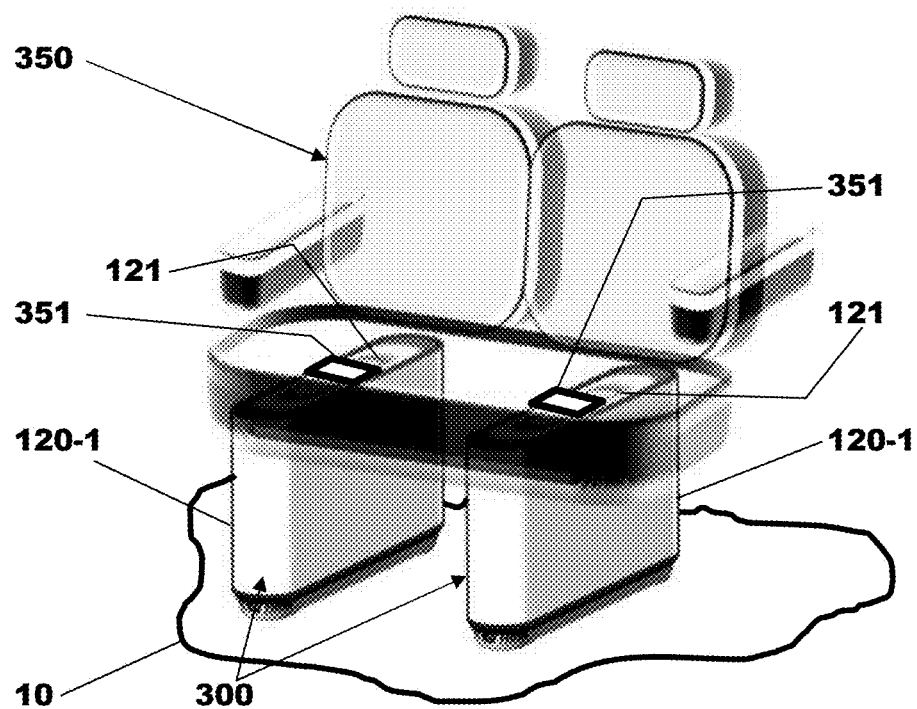
FIG. 11 is a pictorial view showing a bench seat for accommodating two passengers mounted on two spaced apart support pedestals each of which is the same as the support pedestal shown in FIG. 8.

With particular reference to FIG. 11 a further object in the form of a bench seat 350 is shown in position on two spaced apart pedestals 120-1 identical to the pedestal shown in FIG. 8. It will be appreciated that although the bench seat 350 shown is arranged to accommodate two passengers it is also be possible to mount a bench seat for three passengers in the same manner.

As before, each of the pair of two part quick release mounting assemblies required to mount the bench seat 350 includes a second part 351 on a lower side of the bench seat 350 that is constructed so as to automatically latch into respective first parts 121 when the bench seat 350 is placed upon the pair of support pedestals 120-1. Release mechanisms (not shown) are provided to permit the bench seat 350 to be removed from the pair of support pedestals 120-1. Each support pedestal 120-1 and the respective first and second parts 121 and 351 associated with that support pedestal 120-1 form in combination a motor vehicle multi-function mounting apparatus 300.

The arrangement of the support pedestals 120-1 and the two part quick release mounting assemblies allows the bench seat 350 to be mounted in a forward facing rotational position as shown in FIG. 11 or in a rearward facing rotational position. As before both of the support pedestals 120-1 are mounted so as to selectively permit sliding movement of the bench seat 350 relative to the floor 10 of the motor vehicle 1 when rear access is required or for any other purpose.

Figure 12:
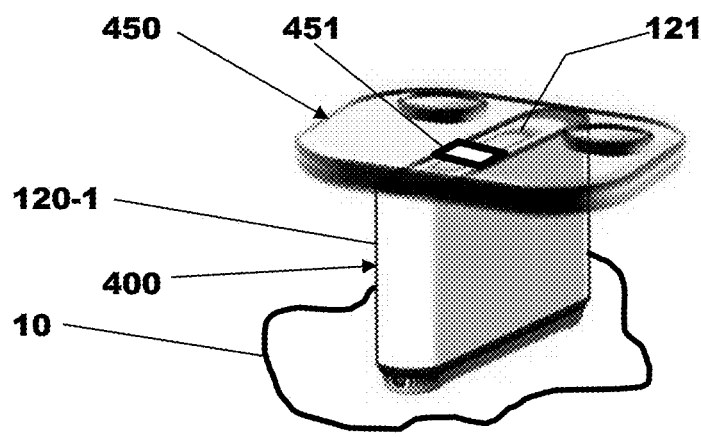
FIG. 12 is a pictorial view showing a table mounted on the support pedestal shown in FIG. 8.

With particular reference to FIG. 12 a further object in the form of a table 450 is shown in position on the support pedestal 120-1. As before, the two part quick release mounting assembly includes a second part 451 on a lower side of the table 450 that is constructed so as to automatically latch into the first part 121 at the top of the support pedestal 120-1 when the table 450 is placed upon the support pedestal 120-1. A release mechanism (not shown) is provided to permit the table 450 to be removed from the support pedestal 120-1. The support pedestal 120-1 and the first and second parts 121 and 451 form in combination a motor vehicle multi-function mounting apparatus 400.

Figure 13:
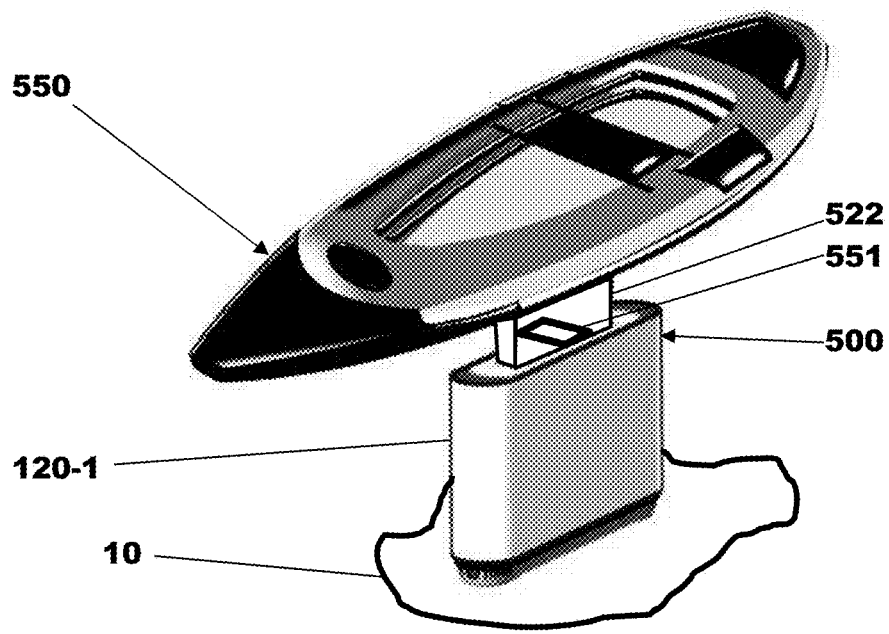
FIG. 13 is a pictorial view showing a sports equipment mount supporting a canoe mounted on the support pedestal shown in FIG. 8.

With particular reference to FIG. 13 a further object in the form of a piece of sports equipment shown as a canoe 550 is shown in position on the support pedestal 120-1. As before, the two part quick release mounting assembly includes a second part 551 on a lower side of a sports equipment support 522 that is constructed so as to automatically latch into a first part 121 (not visible) at the top of the support pedestal 120-1 when the sports equipment support 522 is placed upon the support pedestal 120-1. A release mechanism (not shown) is provided to permit the sports equipment support 522 to be removed from the support pedestal 120-1. The support pedestal 120-1 and the first and second parts 121 and 551 form in combination a motor vehicle multi-function mounting apparatus 500.

The canoe 550 is attached to the sports equipment support 522 by straps or other suitable means (not shown). It will be appreciated that other large pieces of sports equipment could be supported in a similar manner.

Figure 14:
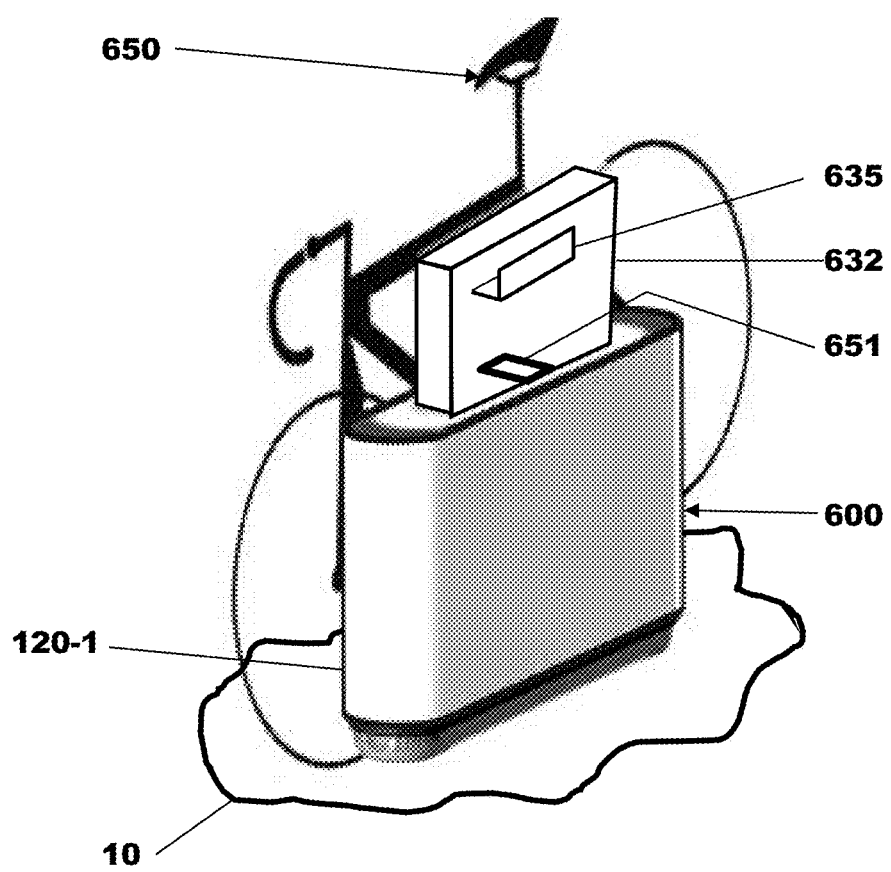
FIG. 14 is a pictorial view showing a dual cycle rack supporting a single cycle mounted on the support pedestal shown in FIG. 8.

With particular reference to FIG. 14 a further object in the form of a cycle 650 is shown in position on the support pedestal 120-1. As before, the two part quick release mounting assembly includes a second part 651 on a lower side of a cycle rack 632 that is constructed so as to automatically latch into the first part 121 (not visible) at the top of the support pedestal 120-1 when the cycle rack 632 is placed upon the support pedestal 120-1. A release mechanism (not shown) is provided to permit the cycle rack 632 to be removed from the support pedestal 120-1. The support pedestal 120-1 and the first and second parts 121 and 651 form in combination a motor vehicle multi-function mounting apparatus 500.

The cycle 650 is attached to the cycle rack 632 by an L-shaped support (not visible) and straps or other suitable means (not shown) are used to hold it in place. The cycle rack 632 is able to support a second cycle on an opposite side and an L-shaped support 635 for the second cycle is shown in FIG. 14. The support pedestal 120-1 and the first and second parts 121 and 651 form in combination a motor vehicle multi-function mounting apparatus 600.

As previously discussed the object mounted on the support pedestal 22; 120-1 by a second part of the two part quick release mounting assembly can be of many differing types including but not limited to a passenger seat, a bench seat, a captain's chair, a table, a sports equipment mount, a cycle rack, an entertainment unit, a storage unit, a child seat, a table, a refrigerator, a storage box and a storage locker It will be appreciated that in each case the respective object is supported upon a support pedestal 25, 120-1 and can easily be removed from the support pedestal 25, 120-1 by releasing a latching mechanism connecting the two parts of the two part quick release mounting assembly.

Figure 15A:
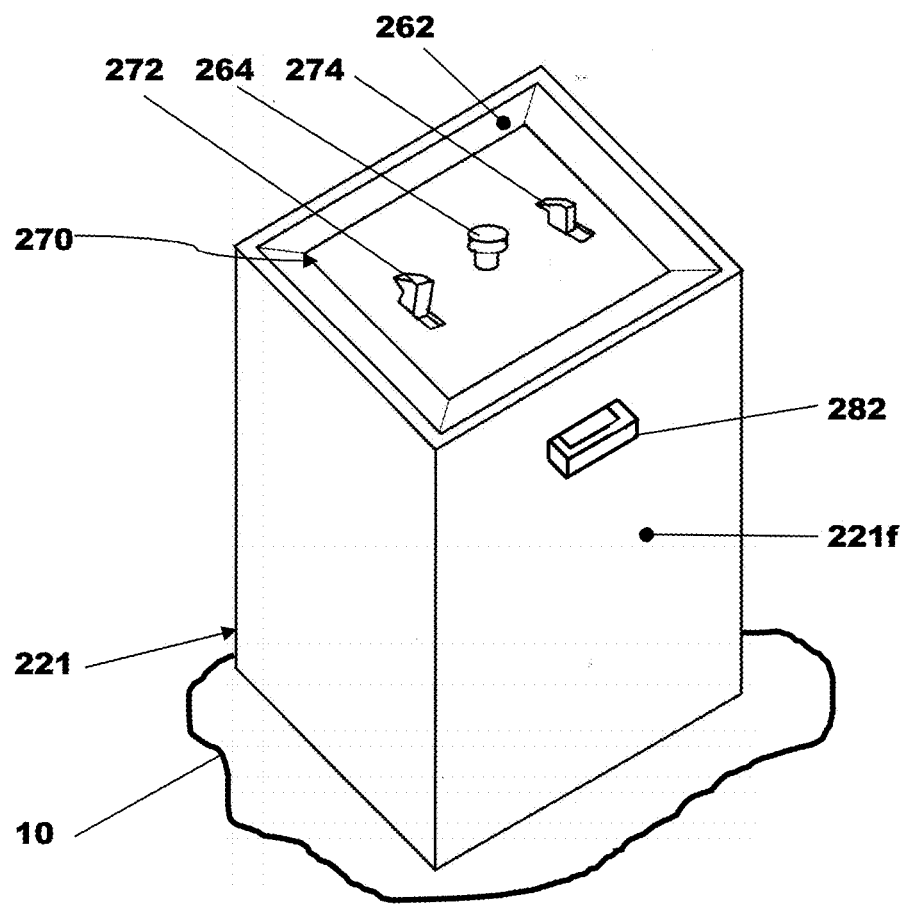
FIG. 15a is a diagrammatic pictorial view from above of an alternative support pedestal forming a first part of a two part quick release mounting assembly.
Figure 15B:
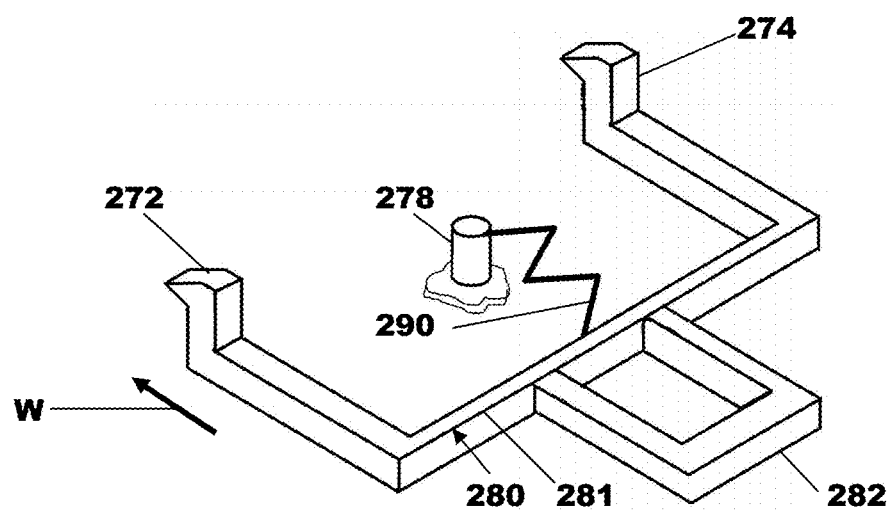
Figure 16:
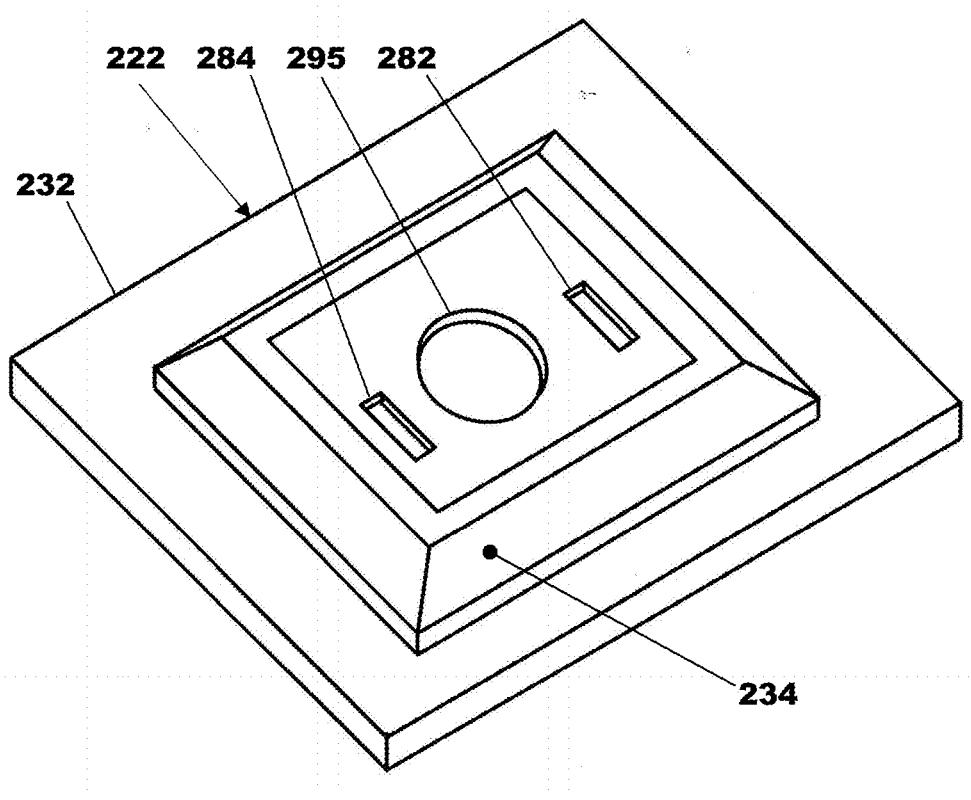
FIG. 16 is a pictorial underside view of a second part of the two part quick release mounting assembly showing a pair of static retention devices for co-operation with latch parts of the latching mechanism shown in FIG. 15b.

With reference to FIGS. 15a-16 there is shown a second embodiment of a motor vehicle multifunction mounting apparatus having a support pedestal 221 including a first part 270 of a two part quick release mounting assembly and a second part 222 of the two part quick release mounting assembly. This second embodiment differs from the first embodiment previously described in that a latching mechanism 280 is formed as part of the first part 270 of the two part quick release mounting assembly and static retention devices in the form of elongate slots 282, 284 formed as part of the second part 222 of the two part quick release mounting assembly. Although not shown in detail this second embodiment uses a similar to the remote release mechanism for a quick release securing mechanism shown in FIG. 5.

A knob 264 shown on FIG. 15a serves the same function as the actuation member 64 shown in FIG. 5 and cooperates in use with other parts of the remote release mechanism through a large aperture 295 formed in the second part 222.

With particular reference to FIGS. 15a and 15b the first part 270 of the two part quick release mounting assembly comprising a latching mechanism 280 and a beveled recess 262 formed in this case by part of the support pedestal 221.

The latching mechanism 280 comprises a pair of hook shaped latches 272, 274 mounted on a U-shaped carrier 281 that is slidingly mounted on the support pedestal 221. The carrier 281 includes a handle 282 that extends out through an aperture in a front side 221f of the support pedestal 221.

A tension spring 290 secured to a pin 278 is used to bias the carrier 281 and the pair of hook shaped latches 272, 274 in the direction of arrow "W" on FIG. 15b into a latching position. The pin 278 is mounted on part of the support pedestal 221 which forms the first part 270 of the two part quick release mounting assembly. The handle 282 is used to move the carrier 281 against the action of the spring 290 so as to release the latching mechanism 280.

With reference to FIG. 16 the second part 222 of the two part quick release mounting assembly comprises a mounting plate 232 used to attach the second part 222 to a passenger seat or other object to be supported, a beveled projection 234 sized and shaped for mating engagement with the beveled recess 262 of the first part 270. The pair of static retention devices in the form of elongate slots 282, 284 and the large aperture 295 previously referred to are formed in a flat upper surface of the beveled projection 234.

When the second part 222 is lowered into position so that the beveled projection 234 engages with the beveled recess 262 of the first part 270 the hook shaped latches 272, 274 snap into engagement with end edges of slots 282, 284 thereby securely connecting the first and second parts 270 and 222 of the two part quick release mounting assembly together and mounting any object secured to the mounting plate 232 to the top of the support pedestal 221.

An object can be easily removed from the support pedestal 221 by pulling on the handle 282 which will release the hook shaped latches 272, 274 from engagement with the end edges of the slots 282, 284 and the object can then be lifted off the support pedestal 221.

Because the two part quick release mounting apparatus includes symmetrical first and second parts 270 and 222, an object mounted on the second part 222 via the mounting plate 232 can be rotated through 180 degrees about a vertical axis by removing the second part 222 from the first part 270, rotating the second part 222 by 180 degrees relative to the first part 270 and then lowering the second part back onto the first part 270 so as to re-engage the hook shaped latches 272, 274 with the slots 282, 284. Therefore, if the object is a passenger seat, it can be simply and easily removed or transitioned from forward facing to rearward facing.

Therefore in summary a multi-function mounting apparatus is provided by the invention that enables a passenger seat of a motor vehicle to be securely mounted on a strong support pedestal while allowing the seat to be simply and easily removed or transitioned from forward facing to rearward facing and additionally allows for alternative objects to a passenger seat to be mounted in the motor vehicle on the same pedestal used for the passenger seat.

It will be appreciated that the accompanying figures are of an illustrative nature and are not necessarily drawn to scale. It will also be appreciated by those skilled in the art that although the invention has been described by way of example with reference to one or more embodiments it is not limited to the disclosed embodiments and that alternative embodiments could be constructed without departing from the scope of the invention as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A motor vehicle comprising:
   a body structure defining a passenger compartment having a floor; and
   a motor vehicle multi-function mounting apparatus mounted on the floor for mounting an object in the passenger compartment, the motor vehicle multi-function mounting apparatus comprising:
   a support pedestal having at a lower end thereof a quick release securing mechanism for securing in use the support pedestal to the floor; and
   a two part quick release mounting assembly for attaching one of a number of differing objects including a passenger seat for a passenger of the motor vehicle to an upper end of the support pedestal, a first part of the two part quick release mounting assembly is formed as part of the support pedestal and a second part of the quick release mounting assembly is formed as part of the object attached to the pedestal, wherein the floor includes a number of longitudinally extending elements and the quick release securing mechanism of each support pedestal is operable in a first mode of operation to react against at least one of the longitudinally extending elements to prevent sliding movement of the support pedestal relative to the floor and the quick release securing mechanism is operable in a second mode of operation to permit sliding movement of the support pedestal along the floor in a longitudinal direction of the motor vehicle, wherein when the object mounted on the support pedestal by the second part of the two part quick release mounting assembly is a passenger seat for a passenger of the motor vehicle, the passenger seat is mountable in forward facing and rearward facing positions, wherein the passenger seat includes a remote release mechanism for the quick release securing mechanism used to secure in use the support pedestal to the floor, and wherein the remote release mechanism includes an actuation member slidingly supported by the first part of the two part quick release mounting assembly and an actuating device moveably mounted on the second part of the two part quick release mounting assembly for abutment against one end of the actuation member so as to selectively release the quick release securing mechanism.

2. The vehicle as claimed in claim 1, wherein one of the two parts of the two part quick release mounting assembly includes a latching mechanism including one or more moveable latch members, each of the latch members being arranged for engagement with a respective static retention device on the other part of the two part quick release mounting assembly.

3. The vehicle as claimed in claim 1, wherein the support pedestal is securable in use to the floor in first and second rotational positions and, in the first rotational position, a first end of the support pedestal is nearer to a front end of the motor vehicle than a second end of the support pedestal and, in the second rotational position, the first end of the support pedestal is nearer to a rear end of the motor vehicle than the second end of the support pedestal.

4. The vehicle as claimed in claim 1, wherein the second part of the two part quick release mounting assembly is attachable to the support pedestal in two rotational positions, one in which a first end of the second part is nearer to a first end of the support pedestal than a second end of the second part and second rotational position in which the first end of the second part is nearer to the second end of the support pedestal than the second end of the second part.

5. The vehicle as claimed in claim 1, wherein the actuating device is moved by a linkage in response to an input from a user of the vehicle applied via a remote human machine input device in the form of one of a handle, a pull knob, a push knob, a rotary knob and a lever.

6. The vehicle as claimed in claim 1, wherein other objects of the number of differing objects which are mountable on the support pedestal by the second part of the two part quick release mounting assembly comprises one or more of a captain's chair, a table, a sports equipment mount, a cycle rack, an entertainment unit, a storage unit, a child seat, a table, a refrigerator, a storage box and a storage locker.

7. The vehicle as claimed in claim 1, wherein there is more than one support pedestal mounted on the floor.

8. The vehicle as claimed in claim 7, wherein there are two support pedestals mounted on the floor and an object is mounted in the passenger compartment using both of the support pedestals.

9. The vehicle as claimed in claim 8, wherein the object is a bench seat for accommodating more than one passenger.

10. A vehicle comprising:
a body structure defining a passenger compartment having a floor; and
a mounting apparatus mounted on the floor for mounting an object in the passenger compartment comprising:
a support pedestal having at a lower end thereof a quick release securing mechanism for securing the support pedestal to the floor; and
a two part quick release mounting assembly for attaching the object to an upper end of the support pedestal a first part of the two part quick release mounting assembly is formed as part of the support pedestal and a second part of the quick release mounting assembly is formed as part of the object attached to the pedestal, wherein when the object mounted on the mounting apparatus is a passenger seat for a passenger of the motor vehicle, the passenger seat is mountable in forward facing and rearward facing positions, wherein the passenger seat includes a remote release mechanism for the quick release mounting assembly used to secure in use the support pedestal to the floor, and wherein the remote release mechanism includes an actuation member slidingly supported by the first part of the two part quick release mounting assembly and an actuating device moveably mounted on the second part of the two part quick release mounting assembly for abutment against one end of the actuation member so as to selectively release the quick release mounting assembly.

11. The vehicle as claimed in claim 10, wherein the floor includes a number of longitudinally extending elements and the quick release securing mechanism of each support pedestal is operable in a first mode of operation to react against at least one of the longitudinally extending elements to prevent sliding movement of the support pedestal relative to the floor and the quick release securing mechanism is operable in a second mode of operation to permit sliding movement of the support pedestal along the floor in a longitudinal direction of the vehicle.

12. The vehicle of claim 10, wherein the object is selectable as one object of a plurality of differing objects.

13. A vehicle mounting apparatus comprising:
a support pedestal having at a lower end thereof a quick release securing mechanism for securing the support pedestal to a floor of a vehicle; and
a two part quick release mounting assembly for attaching an object to an upper end of the support pedestal and having a first part that forms part the support pedestal and a second part that forms part of the object, wherein when the object attached to the support pedestal is a passenger seat for a passenger of the motor vehicle, the passenger seat is mountable in forward facing and rearward facing positions, wherein the passenger seat includes a remote release mechanism for the quick release securing mechanism used to secure in use the support pedestal to the floor, and wherein the remote release mechanism includes an actuation member slidingly supported by the first part of the two part quick release mounting assembly and an actuating device moveably mounted on the second part of the two part quick release mounting assembly for abutment against one end of the actuation member so as to selectively release the quick release securing mechanism.

14. The vehicle of claim 13, wherein the object is selectable as one object of a plurality of differing objects.

* * * * *